US008423093B2

(12) United States Patent
Ren

(10) Patent No.: US 8,423,093 B2
(45) Date of Patent: Apr. 16, 2013

(54) DISCONTINUOUS RECEPTION IN A MOBILE RADIO COMMUNICATIONS NETWORK

(75) Inventor: Weili Ren, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 12/451,823

(22) PCT Filed: Jun. 16, 2008

(86) PCT No.: PCT/JP2008/061371
§ 371 (c)(1),
(2), (4) Date: Dec. 2, 2009

(87) PCT Pub. No.: WO2008/156180
PCT Pub. Date: Dec. 24, 2008

(65) Prior Publication Data
US 2010/0137013 A1     Jun. 3, 2010

(30) Foreign Application Priority Data

Jun. 18, 2007   (GB) .................................. 0711737.7

(51) Int. Cl.
*H04M 1/00*     (2006.01)
*H04B 1/38*     (2006.01)

(52) U.S. Cl.
USPC ....... 455/574; 455/69; 455/226.1; 455/238.1; 370/311

(58) Field of Classification Search .................. 455/574, 455/226.1, 238.1, 69; 370/311
See application file for complete search history.

(56) References Cited

U.S. PATENT DOCUMENTS

| | | | |
|---|---|---|---|
| 5,862,476 A * | 1/1999 | Hasegawa | 455/432.2 |
| 6,668,172 B1 | 12/2003 | Yoshimura | |
| 7,046,962 B1 * | 5/2006 | Belcea | 455/67.11 |
| 8,195,099 B2 * | 6/2012 | Bhattad et al. | 455/69 |
| 2004/0072556 A1 * | 4/2004 | Frantti et al. | 455/404.2 |
| 2004/0076137 A1 * | 4/2004 | Seurre et al. | 370/342 |
| 2007/0064662 A1 * | 3/2007 | Bultan et al. | 370/338 |
| 2007/0293157 A1 * | 12/2007 | Haartsen et al. | 455/67.11 |
| 2008/0064446 A1 * | 3/2008 | Camp et al. | 455/565 |
| 2008/0167089 A1 * | 7/2008 | Suzuki et al. | 455/574 |

FOREIGN PATENT DOCUMENTS

| | | |
|---|---|---|
| EP | 1 096 698 A2 | 5/2001 |
| JP | 11-252633 | 9/1999 |
| JP | 2001-127692 | 5/2001 |

(Continued)

OTHER PUBLICATIONS

Chinese Office Action dated Feb. 22, 2012, with English translation.

(Continued)

*Primary Examiner* — Edward Urban
*Assistant Examiner* — Rui Hu
(74) *Attorney, Agent, or Firm* — McGinn IP Law Group, PLLC

(57) ABSTRACT

The invention provides for a method of controlling discontinuous reception between a mobile radio communications network device and a mobile radio communications device within a mobile radio communications network and including the step of controlling magnitude of the discontinuous reception period in a manner responsive to the velocity of movement of the mobile radio communications device within the network such that a decrease in velocity can lead to an increase in the discontinuous reception period employed by the devices.

13 Claims, 2 Drawing Sheets

FOREIGN PATENT DOCUMENTS

| | | | |
|---|---|---|---|
| JP | 2003-101475 | | 4/2003 |
| JP | 2004-274048 | * | 9/2005 |
| JP | 2005-260906 | | 9/2005 |
| JP | 2005-260906 A | | 9/2005 |

OTHER PUBLICATIONS

"Uplink synchronization", 3GPP TSG RAN WG2#57, R2-070781, NTT DoCoMo, Inc., Feb. 16, 2007.

* cited by examiner $\tau$ timing offset over $(t_2 - t_1)$

DISCONTINUOUS RECEPTION IN A MOBILE RADIO COMMUNICATIONS NETWORK

The present invention relates to discontinuous reception within a mobile radio communications network and, in particular, to a method of controlling discontinuous reception and to a related mobile radio communications device and mobile radio communications network device.

Discontinuous reception (DRX) is employed within mobile radio communications networks to allow a mobile radio communications device such a User Equipment (UE) handset to repeatedly enter temporary sleep modes in order to assist with power saving and thereby improve the efficiency of operation of the handset.

Indeed, discontinuous reception is considered to be a particularly attractive method of operation for emerging network systems such as Long Term Evolution (LTE) systems.

LTE systems are packet centric and the signalling arising therein is generally busty and discontinuous so that power saving from DRX operation within such systems could be significant. It is also anticipated that UEs will remain in a connected state for relatively long periods such that efficient DRX operation for the UE in a connected state can prove an important requirement.

However, while in DRX operation relatively long DRX periods prove attractive, the UE may lose uplink (UL) timing after a long sleeping period due to the UE mobility, i.e. the current timing advance (TA) values may become invalid.

Current proposals within 3GPP UL timing control is that UL timing is on per need basis having regard to QoS requirements of the services established. If the UE needs to maintain UL timing in the connected state in order to minimise latency of data transmission resumption, the UE has to perform periodic update of UL timing. Various proposals presented in recent 3GPP RAN1 and RAN2 meetings suggest that the update rate is calculated based on the fastest UE speed with the permitted maximum TA inaccuracy. This leads to a UL timing update rate of 2 Hz to take account of the fastest likely UE speed of 350 km/h. However a UL timing update rate of 2 Hz would limit the DRX period to being less that 0.5 second, due to the requirement that the UE should not transmit during sleeping periods, and should only transmit/receive during wake-up duration in order to maximise power-saving.

However such employment of discontinuous reception is disadvantageously limited since its potential for offering enhanced power-saving is not realised for all operational scenarios particularly having regard to variations in the velocity of the UE.

In particular, power-saving arising from the adoption of DRX operation is disadvantageously limited when, as occurs for a relatively large number of UE handsets, their speed of movement within a cell is far less than 350 km/h.

The present invention seeks to provide for a discontinuous reception communication system employing a method of controlling discontinuous reception, and related mobile radio communications devices and mobile radio communications network devices, having advantages over known such systems, methods and devices.

According to a first aspect of the present invention there is provided a method of controlling discontinuous reception between a mobile radio communications network device and a mobile radio communications device within a mobile radio communications network and including the step of controlling the magnitude of the discontinuous reception period in a manner responsive to the velocity of movement of the mobile radio communications device within the network.

The present invention proves advantageous insofar as, through making the magnitude of the discontinuous reception period dependent upon the velocity of the mobile radio communications device within, for example, a cell of a mobile radio communications network, the length of the sleeping periods can be increased when the mobile radio communications device is found to be moving relatively slowly thereby enhancing power-saving within the mobile radio communications device.

As discussed further below, when it can be identified that the mobile radio communications device is moving relatively slowly, it is appreciated that uplink (UL) timing updates are required less frequently such that an increase in discontinuous reception periods can be accommodated without affecting UL timing synchronisation.

Advantageously, the period of discontinuous reception is controlled in a manner responsive to the velocity of the mobile radio communications device in a direction towards, or away from, the mobile radio communications network device.

In one embodiment, the method includes the step of determining the velocity at the mobile radio communications device and by way of a timing off-set signal.

In particular the aforementioned timing off-set signal can be derived from downlink (DL) signalling such as for example, downlink reference signals (DL RS).

Advantageously, the discontinuous reception period can therefore be responsive to UL timing synchronisation requirements having regard to the velocity of the mobile radio communications device.

According to another embodiment, the above-mentioned velocity can be measured at the mobile radio communications network device and, preferably, by way of a timing off-set signal.

In particular, the velocity can be determined by means of determining the change in timing advance (TA) and by way of the CQI signalling received from the mobile radio communications device.

Advantageously, the method further includes the step of signalling from the mobile radio communications network device to the mobile radio communications device that a change in discontinuous reception period is to be initiated.

According to a particularly advantageous feature, the said period of discontinuous reception can be increased, or decreased, in a stepwise manner responsive to the velocity of movement of the mobile radio communications device.

In this manner, a series of threshold velocity values are provided, each corresponding to a respective one of the range of discrete and discontinuous reception periods.

Advantageously, the method can include the step of broadcasting the threshold values within BCH signalling, or alternatively, unicast them during RRC establishment.

Indeed, the threshold values can be determined within the mobile radio communications network device having regard to at least one of cell size cyclic prefix length and likely measurement accuracy.

According to another aspect of the present invention there is provided a mobile radio communications device arranged for discontinuous reception within a mobile radio communications network and arranged to determine velocity of movement and to compare the determined velocity with threshold values, the device further being arranged to signal to the network for a change in discontinuous reception period responsive to the result of the said comparison.

Advantageously, the mobile radio communications device is arranged to determine the said velocity value with reference to a timing off-set value.

In particular, the timing off-set value is determined from DL signalling and, in particular, DL RS.

In this manner, it will be appreciated that the discontinuous reception period can prove responsive to UL timing synchronisation requirements having regard to the velocity of movement of the mobile radio communications device.

Yet further, a series of threshold values are advantageously provided each corresponding to one of a stepwise increasing or decreasing discontinuous reception period.

The mobile radio communications device can further be arranged to receive the aforesaid threshold values are received in BCH signalling or, alternatively, during RRC establishment.

According to yet a further aspect of the present invention there is provided a mobile radio communications network device arranged for discontinuous reception with a mobile radio communications device within a mobile radio communications network, the said network device being arranged to determine the velocity of movement of the mobile radio communications device and to compare the determined velocity with threshold values, the network device further being arranged to signal to the mobile radio communications device a change in discontinuous reception period responsive to the result of said comparison.

The velocity is advantageously determined within the mobile radio communications network device by reference to a timing off-set value.

The timing off-set value can advantageously be determined with reference to a change in TA values and by reference to CQI signalling received from the mobile radio communications device.

In particular, the mobile radio communications network device can be arranged to provide signalling to the mobile radio communications device for a change in discontinuous reception period.

The mobile radio communications network device is further arranged to broadcast the aforesaid threshold values within BCH signalling or unicast them during RRC establishment.

The threshold values are advantageously determined within the mobile radio communications network device having regard to at least one of cell size, cyclic prefix length and measurement accuracy.

As will therefore be appreciated, the invention presents a method that can utilise timing off-set values measured on a downlink signal such as a wideband DL DS1 (downlink reference signal 1) to estimate UE velocity in a direction of UE movement towards or away from a network device such as eNB, and to render UL timing update rate dependent upon such UE velocity.

The method of the invention finds particular applicability with DRX operation in connected state, e.g. LTE_ACTIVE in 3GPP LTE, and allows for a UE required to maintain UL timing and moving slowly to be configured with a relatively longer DRX cycle to improve power-saving.

The invention is described further hereinafter, by way of example only, with reference to the accompanying drawings in which.

Figure 1:
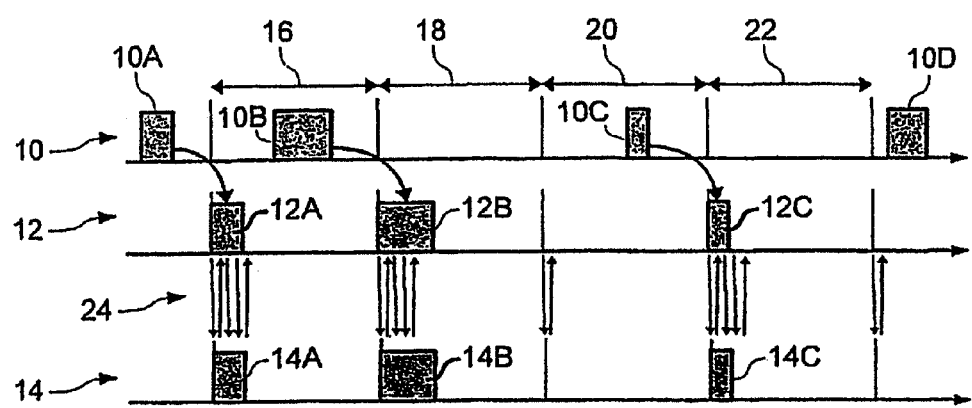
FIG. 1 is a timing diagram illustrating discontinuous reception operation within a LTE system.

Turning first to FIG. 1, there is provided a signaling diagram illustrating the signalling arising in, and transmitted from, a mobile radio communications network device such as an eNB within a LTE network, and also the manner of receipt of such a transmitted signal at a mobile radio communications device such as UE within a LTE network and in accordance with discontinuous reception.

Thus, at an eNB, data 10 is first buffered prior to transmission 12 from the eNB to the UE at the beginning of each discontinuous reception period.

Each of the separate data blocks 10a, 10b, 10c, 10d buffered in the eNB, and subsequently transmitted to the UE at the beginning of a discontinuous reception period are indicated respectively as data portions 12a, 12b and 12c—with portion 12d not shown in the diagram.

Each of the illustrated transmitted data portions 12a-12c as received at the UE are indicated as received data 14 at the UE and shown respectively as 14a, 14b and 14c.

The manner in which the data portions 12a-12c are transmitted from the eNB, and subsequently received as 14A-14C at the UE, is indicated with reference to a series of discontinuous reception periods 16, 18, 20, 22.

As will be appreciated, the UE knows that, when awakening at the beginning of each discontinuous reception periods 16-22, if data is available from the eNB such as DL Down Link Reference Signalling (DL RS) etc then it will be available for receipt at the beginning of the discontinuous reception period. Then, and as illustrated with reference to discontinuous reception period 20, if there is no data to be received, the UE can remain in sleep mode for the full extent of the discontinuous reception period 20 and thereby seek to maximise power-saving.

Upon receipt of the data 14 at the UE, signalling 24, such as CQI reporting is likewise initiated in the UE.

As an example, DRX operation in LTE_ACTIVE is assumed to operate as illustrated in FIG. 1. At the start of each DRX period, the UE wakes up for possible DL Data transmissions. It starts with measuring DL RS for various purposes, including DL timing correction. The UE then sends a CQI report to help the eNB select the correct link adaptation for scheduling since the previously received CQI is likely to have become out of date after a long sleep period. The CQI signalling can also be measured by the eNB to calculate a new TA value for UL timing update in DRX operation. As noted, CQI reporting is transmitted once a DRX period to allow for the UE to sleep without disturbance in the middle of a sleeping period in an attempt to maximise power-saving. This proves to be an efficient scheme for UL timing update in DRX operation, in which DRX cycle is equal to UL timing update period.

As a particular example, in LTE_ACTIVE, the UE regularly measures DL RS for DL channel estimation and CQI reporting etc. when in continuous reception mode. In DRX mode however, the UE wakes up at start of each DRX period, and measures DL RS for DL timing updating, channel estimation and CQI reporting for possible data receptions. 3GPP proposals suggest that DL DS1 and DL RS2 are mandatory, and DL RS3 and DL RS4 are optional for MIMO reception of the UE.

Figure 2:
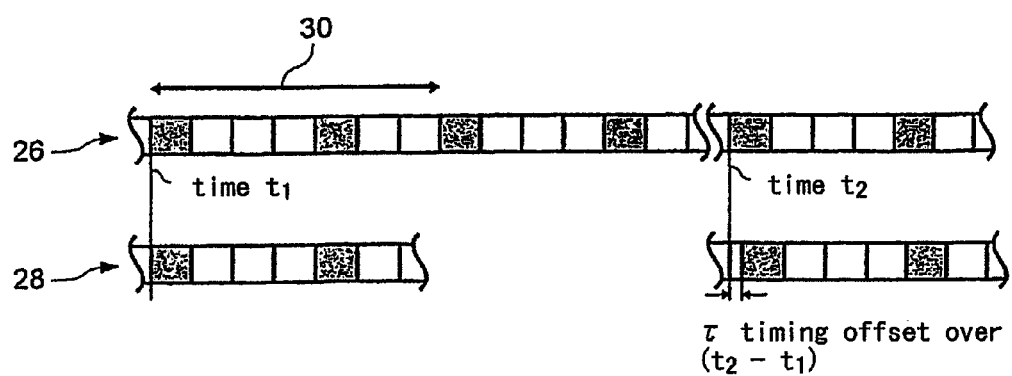
FIG. 2 is a timing diagram illustrating a timing off-set value.

As a result of basic measurement on DL RS1, the UE can detect DL timing off-set, as shown in FIG. 2. Here a DL RS1 transmission from a eNB is shown along with the signal 28 as received at the UE. The sub-frame length 30 is also shown as is the timing off-set t arising over a time period $(t_2-t_1)$. Over a certain amount of time, the timing off-set of DL RS1 is generally caused by the UE mobility, and its magnitude is dependent on UE velocity. The greater the UE velocity, the larger will be the timing off-set of RS1. Based on the timing off-set of DL RS1, the UE can then readily calculate how far it has moved towards, or away from, the eNB over that time. In the case of UE in DRX operation $(t_2-t_1)$=DRX cycle. The velocity of the UE in the direction of moving toward or away from the eNB is equal to:

$$v=(\tau \times c)/(t_2-t_1)$$

Where c is speed of light.

This estimated velocity can be averaged over a DRX period

In the DRX scheme that will be adopted in LTE_ACTIVE, a set of DRX cycles (e.g. $DRX_0$ $DRX_1$ ..., DRXmax) are configured by the eNB and sent to a specific UE when a new (RB) radio bearer is added for the UE, or an existing RB is released or modified. The set of DRX cycles is generally determined by the eNB based on the QoS requirements of all established RBs. The initial DRXmax can be set to be 0.5s to ensure a 2 Hz UL timing update rate. The DRX cycle that is currently being used can be controlled by the eNB or can be autonomously determined by the UE based on the current UE activity level and can not exceed DRXmax. DRXmax is limited to being less than 0.5 seconds in the absence of the present invention and if the UE is required to maintain UL timing.

By estimating UE velocity using DL RS timing off-set in accordance with an embodiment of the present invention DRXmax can be extended to a much larger value depending on the estimated velocity. The relationship between DRXmax measured DL RS timing off-set and the estimated velocity is shown in the table below.

vehicles will take at least a few seconds to accelerate to 70 mph from stationary, and will take similar amount of time to decelerate. On the other hand, when the UE is moving quickly, the $DRX_{max}$ value it can reach may have already reduced to a small value in the order of 0.5s, so that the measurement will be conducted more regularly.

The proposed method in the innovation tolerates, to great extent, inaccuracy of measured DL RS1 timing off-set, which could be caused by abrupt change of delay spread profile or "corner effect". Most of these errors can be removed or reduced by averaging the estimation over the entire frequency band and over multiple DRX periods. Even if the residual error is not negligible, for example, up to 20%, it is simply just required to adjust the ranges to leave sufficient margins for the error.

As will be appreciated from this specific embodiment, the invention does not require that the UE perform any new measurement in order to be functional. It actually just makes use of existing measurement to obtain the timing off-set of DL RS1. Therefore the invention can achieve the benefit of allowing slow-moving UEs to employ longer $DRX_{max}$ periods in order to maximise power-saving at no extra cost.

Figure 3:
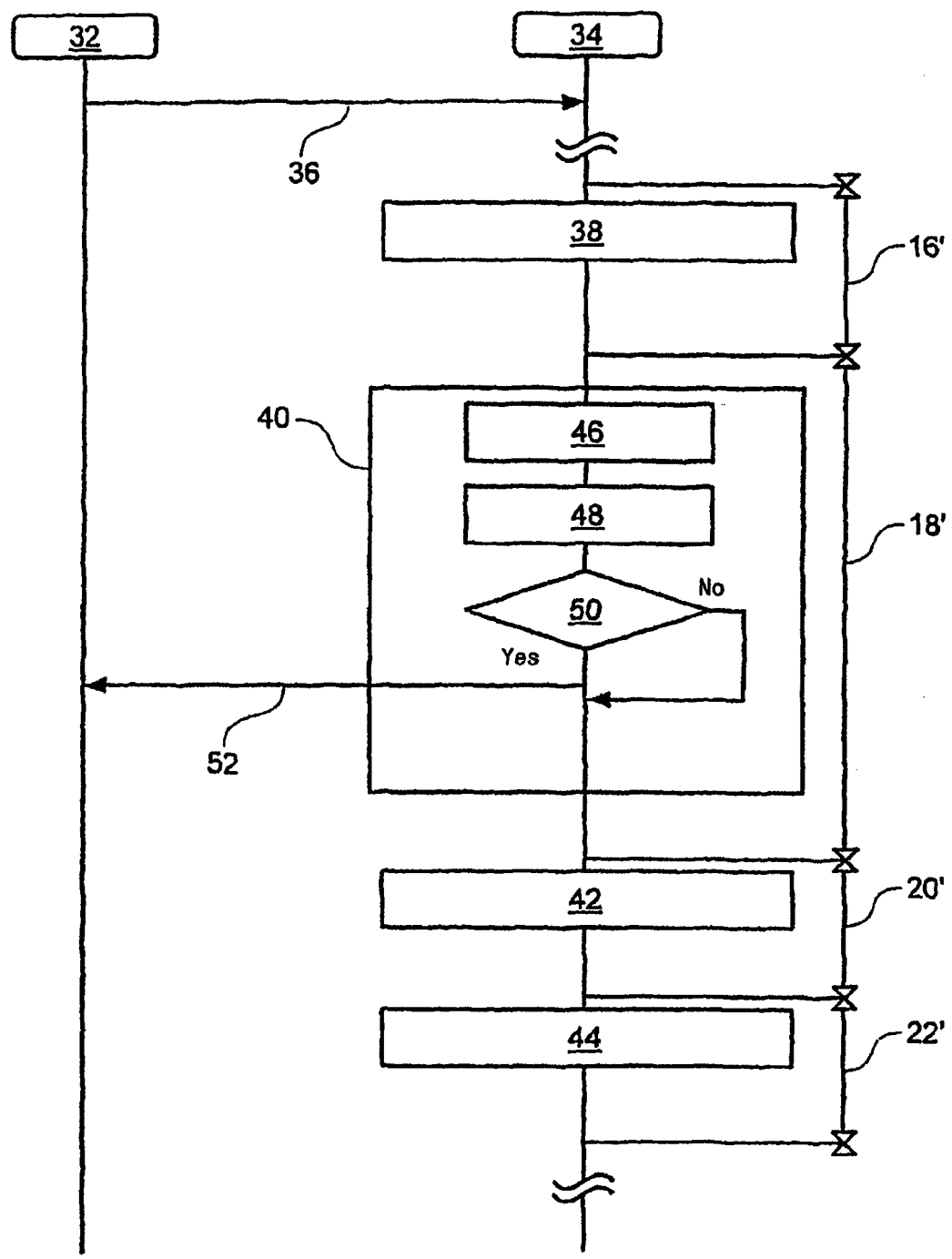
FIG. 3 is a signalling diagram for a radio communications device and mobile radio communications network device according to an embodiment of the present invention.

Turning now to FIG. 3, there is provided, as further illustration of the present invention, a flow diagram representing signalling between a mobile radio communications network device such as an eNB 32 of a LTE network, and UE 34 operating within that network.

| | DRX being used (s) | | | | | | | | |
|---|---|---|---|---|---|---|---|---|---|
| | 0.5 | | | | 1 | | | | ... |
| Measured DL RS timing off-set (μs) | ≦0.162, >0.081 | ≦0.081, >0.041 | <0.041, >0.016 | ≦0.016 | ≦0.324, >0.162 | ≦0.162, >0.081 | ≦0.081, >0.032 | ≦0.032 | ... |
| Estimated UE velocity (km/h) | ≦350, >175 | ≦175, >87.5 | ≦87.5, >35 | ≦35 | ≦350, >175 | ≦175, >87.5 | ≦87.5, >35 | ≦35 | ... |
| $DRX_{max}$ (s) | 0.5 | 1 | 2 | 5 | 0.5 | 1 | 2 | 5 | ... |

When the estimated velocity falls into a range that corresponds to smaller or larger $DRX_{max}$ period then the UE can indicate this to the eNB for updating $DRX_{max}$ to this new value.

As noted above, when the UE is in DRX operation, it sends CQI reporting once per DRX period. The eNB can measure the arrival time of CQI signal to calculate new TA. By doing so, eNB also knows UL timing off-set over the time, which is equal to ΔTA. The UL timing off-set is denoted as η. As an alternative to the above embodiment therefore the velocity of the UE in a direction moving towards, or away from, the eNB can be calculated by the eNB $$v=(\eta \times c)/(2\times(t_2-t_1))$$

This alternative differs from the above embodiment in that the eNB signals to the UE when the estimated velocity falls into a scope that corresponds to a smaller or larger $DRX_{max}$.

The measurement of DL RS timing off-set can be performed once per DRX period while the UE is in DRX operation and it is found to be frequent enough to keep up with any significant change of UE velocity. In practice, the faster the UE moves, the longer the UE will actually take to change direction. That is a motorway speed car will take many seconds to make a right-angle turn. Secondly, acceleration and de-acceleration of the UE is relatively slow, since most motor This signalling diagram represents an illustration of an embodiment of the invention with regard to UE 34 operating within a LTE_ACTIVE DRX mode.

Signalling from the eNB 32 to the UE 34 relevant to the present invention commences with RRC configuration signalling 36 serving to deliver to the UE 34 the range of possible discontinuous reception (DRX) values that can be adopted having regard to the determined velocity of movement of the UE 34 towards, or away from, the eNB 32.

As illustrated earlier with reference to FIG. 1, at the beginning of each discontinuous reception period, identified in FIG. 3 as 16', 18', 20', 22', respective data blocks 38, 40, 42, 44 is transmitted to the UE 34.

The UE 34 is arranged to conduct the usual measurements upon each data block as received and, in accordance with the present invention, employs the signalling arising within the data block in a novel and advantageous manner.

With reference to discontinuous reception period 18', the data block 40 received is illustrated in greater detail.

As can be seen, upon receipt of the data block 40, the UE 34 is arranged to measure 46 the DL RS1 signalling in order to identify a timing off-set value so as to update DL timing.

In addition, the DL timing off-set value is employed to determine the velocity 48 of the UE 34, which velocity is then compared 50 with the various threshold values corresponding to the series of different continuous reception periods to ascertain which of those periods should be employed within the UE 34.

If, at step 50, it is determined that the velocity has moved above, or below, one of the threshold values, such that a change in discontinuous reception period would be appropriate, this is indicated by a signalling 52 to the eNB 32 so that a different, and more efficient, discontinuous reception period can be adopted having regard to the velocity of movement of the UE 34.

If, alternatively, at step 50, no threshold value has been crossed, then the current discontinuous reception period remains and the UE 34 is retained in its sleep mode for the reminder of the discontinuous reception period 18' until such time as it wakes to receive the next data block 42 to be delivered at the beginning of the next discontinuous reception period 20'.

Thus, as will be appreciated from the above, the invention employs a timing off-set of DL RS1 over a certain amount of time to estimate UE velocity in the direction of movement of the UE either towards or way from, the eNB while UE is in DRX operation.

As an alternative, the variation of TA over a time period is measured by the eNB using UL CQI signal to estimate UE velocity again in a direction of movement either towards or away from, the eNB while UE is in DRX operation mode.

UL timing update rate is then made dependent upon such determined UE velocity, thus the UEs that move slowly and have low activity level can be configured with a much longer DRX cycle to maximise power-saving while maintaining UL synchronisation.

The threshold velocity values comprising boundary parameters for $DRX_{max}$ change are either broadcast in BCH channel or sent to the UE individually during RRC connection establishment. These values can be determined by the eNB by taking into account at least one of cell size, cyclic prefix length and achievable measurement accuracy etc.

The UE velocity is therefore employed to decide how quickly its current TA could become invalid, i.e. how frequently the UE has to perform UL timing update to keep UL time synchronised. The update rate in turn decides upper limit of DRX cycles that the UE can be configured when it is in DRX operation. The invention therefore allows for the UE that needs to maintain UL timing and moves slowly and has low activity level to be configured with a much longer DRX cycle to achieve improved power-saving.

The invention claimed is:

1. A method of controlling discontinuous reception between a mobile radio communications network device and a mobile radio communications device within a mobile radio communications network, comprising:
    controlling the magnitude of the discontinuous reception period in a manner responsive to the velocity of movement of the mobile radio communications device within the network; and
    determining the velocity at the mobile radio communications network device by way of a timing off-set signal,
    wherein the velocity is determined by means of determining a change in a timing advance value, and
    wherein the controlling of the magnitude is performed such that the magnitude of the discontinuous reception period increases as the velocity of the mobile radio communications device decreases.

2. The method as claimed in claim 1, wherein the period of discontinuous reception is controlled in a manner responsive to the velocity of the mobile radio communications device in a direction towards, or away from, the mobile radio communications network device.

3. The method as claimed in claim 1, wherein the discontinuous reception period is responsive to UL timing synchronisation requirements having regard to the velocity of the mobile radio communications device.

4. The method as claimed in claim 1, further comprising:
    signalling from the mobile radio communications network device to the mobile radio communications device that a change in discontinuous reception period is to be initiated.

5. The method as claimed in claim 1, wherein said period of discontinuous reception is varied in a stepwise manner responsive to the velocity of movement of the mobile radio communications device.

6. The method as claimed in claim 5 and employing a series of threshold values each corresponding to a respective one of a range of discrete discontinuous reception periods.

7. The method as claimed in claim 6, further comprising:
    either broadcasting the threshold values within the BCH, or unicasting them during RRC establishment.

8. The method as claimed in claim 6, wherein the threshold values can be determined within the mobile radio communications network device having regard to at least one of cell size, cyclic prefix length and likely measurement accuracy.

9. A mobile radio communications network device arranged for discontinuous reception with a mobile radio communications device within a mobile radio communications network, comprising:
    a first unit that determines the velocity of movement of the mobile radio communications device;
    a second unit that compares the determined velocity with threshold values; and
    a third unit that signals to the mobile radio communications device for a change in discontinuous reception period responsive to the result of said comparison,
    wherein the velocity is determined by reference to a timing off-set value,
    wherein the off-set value is determined with reference to a change in a timing advance value, and
    wherein the third unit increases the discontinuous reception period as the determined velocity decreases.

10. The network device as claimed in claim 9, wherein the off-set value is determined by reference to CQI signalling received from the mobile radio communications device.

11. The network device as claimed in claim 10, wherein the mobile radio communications device is provided signalling that a different discontinuous reception period is to be employed.

12. The network device as claimed in claim 11, wherein threshold velocity values are broadcast within at least one of BCH signalling or unicast them within RRC signalling.

13. The network device as claimed in claim 9, wherein the threshold values are determined within the mobile radio communications network device having regard to at least one of cell size, cyclic prefix length and measurement accuracy.

* * * * *